April 23, 1963    J. W. TUMAVICUS    3,086,358
ROCKET NOZZLE CONSTRUCTION
Filed May 25, 1959

INVENTOR
JULIUS W. TUMAVICUS
BY Charles R. Warren
ATTORNEY

3,086,358
ROCKET NOZZLE CONSTRUCTION
Julius W. Tumavicus, Indiantown, Old Saybrook, Conn., assignor to United Aircraft Corporation, East Hartford, Conn., a corporation of Delaware
Filed May 25, 1959, Ser. No. 815,738
1 Claim. (Cl. 60—35.6)

This invention relates to a wall structure for a thrust nozzle or combustion chamber particularly useful in a rocket.

One feature of the invention is an arrangement of axially extending rods or tubes to form the wall of the chamber or nozzle without the necessity of tapering the rods or tubes to accommodate changes in diameter of the chamber or nozzle. Another feature is an arrangement of this type in which the wall is made of tubes and in which the coolant flowing through the tubes is not restricted by changes in diameter of the tubes between its ends.

In a nozzle arrangement, the change in diameter from the throat to the outlet is such that dimensions of the axially extending rods or tubes forming the nozzle wall must vary substantially in a direction circumferentially of the nozzle in order to accommodate diametral changes in the nozzle and at the same time to maintain the same number of rods or tubes throughout the length of the nozzle. One feature of the invention is an arrangement of the axial tubes or rods such that no transverse or circumferential dimensional change is necessary in the rods. Another feature is the use of two sizes of tube diameters in the nozzle where the nozzle is to be cooled with the coolant flow so arranged that the flow of coolant is first through the smaller diameter tubes which line the nozzle at the throat.

Ohter feature and advantages will be apparent from the specification and claim, and from the accompanying drawing which illustrates an embodiment of the invention.

Figure 1:
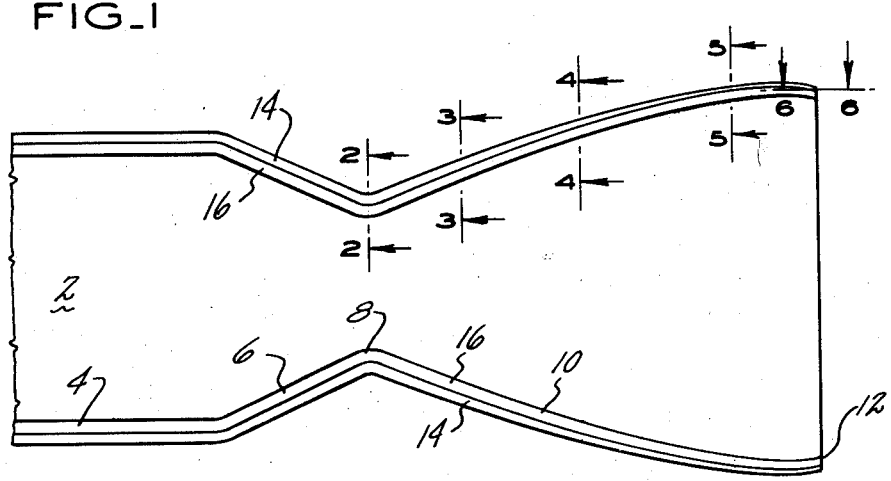
FIG. 1 is a longitudinal sectional view through a nozzle embodying the invention.

The invention is shown in a rocket having a combustion chamber 2, the wall 4 of which is cylindrical for a portion thereof and then becomes frusto-conical at 6 toward the throat 8 of the nozzle. Downstream of the throat the wall 10 of the nozzle is divergent toward the outlet end 12 of the nozzle.

The wall shown is made up of axially extending tubes 14 and 16, the tubes 14 being somewhat larger in diameter than the tubes 16 for a purpose that will hereinafter appear. Although the elements 14 and 16 are shown and described as tubes, it will be understood that except where cooling of the nozzle wall is desired, these elements 14 and 16 may be rods instead of tubes, although in each case, there will be two different diameters of rods or tubes.

Figure 2:
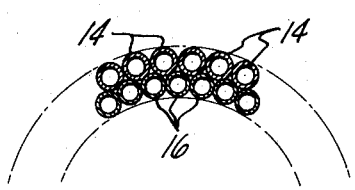
FIG. 2 is a transverse fragmentary sectional view on a larger scale along the line 2—2 of FIG. 1.

As shown in FIG. 2, at the throat of the nozzle, which is the point where the nozzle diameter is the smallest, the tubes or rods 14 are arranged in a circumferential ring and are in circumferential engagement with each other. At this point, the tubes or rods 16 also form a continuous ring located inside of the row of tubes 14 and also in circumferential engagement with adjacent tubes 16. The tubes 14 and 16 are staggered with respect to each other, as shown in FIG. 2, so that at this point the nozzle is a double-wall construction consisting of the inner wall made up of of the ring of tubes 16 and an outer wall made up of the ring of tubes 14. This entire assembly is brazed together into a complete unit. The tubes 16 fit within the grooves or slots formed by adjacent tubes 14.

Figure 3:
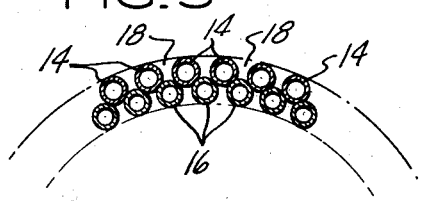
FIG. 3 is a view similar to FIG. 2 along the line 3—3 of FIG. 1.

As the nozzle diameter increases, for example, at the point represented by the section line 3—3, adjacent tubes 14 diverge from each other so that the several tubes 14 are spaced apart, as in FIG. 3. Similarly, each of the tubes 16 forming the inner row also diverges from the adjacent tubes of the same row. Each tube 16 is offset circumferentially from the surrounding tube 14 so that each tube 16 will lie within the slot or groove 18 defined between adjacent tubes 14 as they diverge from each other. Accordingly, the tubes 14 and 16 in combination still form a continuous nozzle wall with the alternate tubes in the nozzle, the tubes 14 for example, forming a ring radially outwardly of the ring of the interspaced tubes 16.

Figure 4:
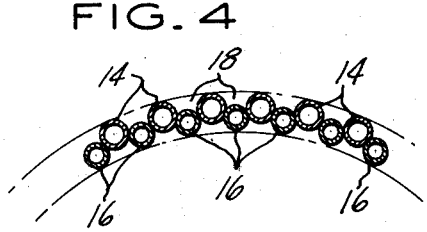
FIG. 4 is a view similar to FIG. 2 along the line 4—4 of FIG. 1.

Referring now to FIG. 4 where the nozzle wall is still larger in diameter, the tubes 14 are more widely spaced in a circumferential direction and the tubes 16 are still in contact with the tubes 14 and are still offset circumferentially from the tubes 14 so that the tubes 16 lie within the grooves 18 and continue to provide a continuous nozzle wall.

Figure 5:
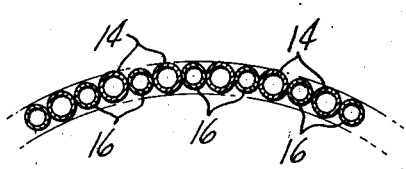
FIG. 5 is a sectional view similar to FIG. 2 substantially along the line 5—5 of FIG. 1.

Referring now to FIG. 5, at the largest diameter of the nozzle wall, the tubes 14 are now more widely spaced apart circumferentially of the nozzle and the tubes 16 are in circumferential alignment with the tubes 14. The tubes 16 have the same circumferential dimension as the slot between adjacent tubes 14 so that the tubes 16 in the position of FIG. 5 combine with the tubes 14 to form a continuous nozzle wall.

After the assembly of the tubes 14 and 16 is completed, as shown, the entire assembly is brazed together thereby forming a completed nozzle wall consisting of the two sets of tubes or rods, each of which, by reason of the offset arrangement, may be a constant diameter throughout the entire length of the nozzle construction.

Figure 6:
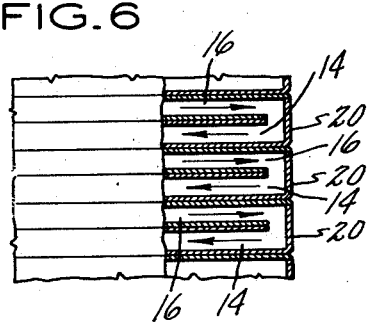
FIG. 6 is a fragmentary longitudinal sectional view developed substantially along the line 6—6 of FIG. 1.

The flow of coolant through the tubes 14 and 16 may be arranged in any desired manner. However, it is preferable that the coolant flowing through the tubes 16 be in a direction downstream of the nozzle and that the return flow of coolant be in the outer ring of tubes 14. To accomplish this, each tube 16 at the downstream end, as shown in FIG. 6, is connected to the adjacent tube 14 as by end caps 20. In this way the flow of coolant will be first through the inner row of tubes 16 when the coolant is at the lowest temperature and therefore must be effective. The return flow of coolant will be through the larger diameter tubes 14.

Figure 7:
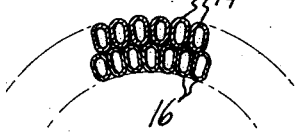
FIG. 7 is a view similar to FIG. 2 showing a modification.

To decrease the nozzle throat diameter, it may be desirable as shown in FIG. 7, to flatten the tubes to elliptical or oval shape with the major axis radial so that more tubes of a selected diameter may be accommodated at the throat. Similarly the tubes may be flattened in the opposite direction at the largest nozzle diameter to make possible an increased diameter at this point.

It is to be understood that the invention is not limited to the specific embodiment herein illustrated and described, but may be used in other ways without departure from its spirit as defined by the following claim.

I claim:

A wall structure for a rocket in which the wall is substantially annular and varies in diameter in an axial direction, said wall structure being made up of axially extending tubes arranged in a ring with the tubes in contact with one another and brazed together so that said tubes so brazed form said wall structure, said tubes comprising a first set of constant diameter tubes and a second set of constant diameter tubes of smaller diameter than and positioned alternately with said tubes of said first set, said tubes being positioned so that all tubes are in circumferential alignment at the largest diameters of the wall structures and smoothly change in relative radial and circumferential position until at the smallest diameters of said wall structure said first set of tubes are in circumferentially abutting relation at a first radius and said second set of tubes are in circumferentially abutting relation at a second radius smaller than said first radius, said radii and said tube diameters selected such that with said tubes of said first and second sets circumferentially staggered at said wall structure smallest diameters, each tube of each set abuts two tubes of each set adjacent thereto to form small interstices therewith for maximum braze strength.

References Cited in the file of this patent
UNITED STATES PATENTS

| | | |
|---|---|---|
| 2,880,577 | Halford et al. | Apr. 7, 1959 |
| 2,958,183 | Singelmann | Nov. 1, 1960 |
| 2,977,754 | Bell | Apr. 4, 1961 |

FOREIGN PATENTS

| | | |
|---|---|---|
| 809,844 | Great Britain | Mar. 4, 1959 |